United States Patent Office 3,321,047
Patented May 23, 1967

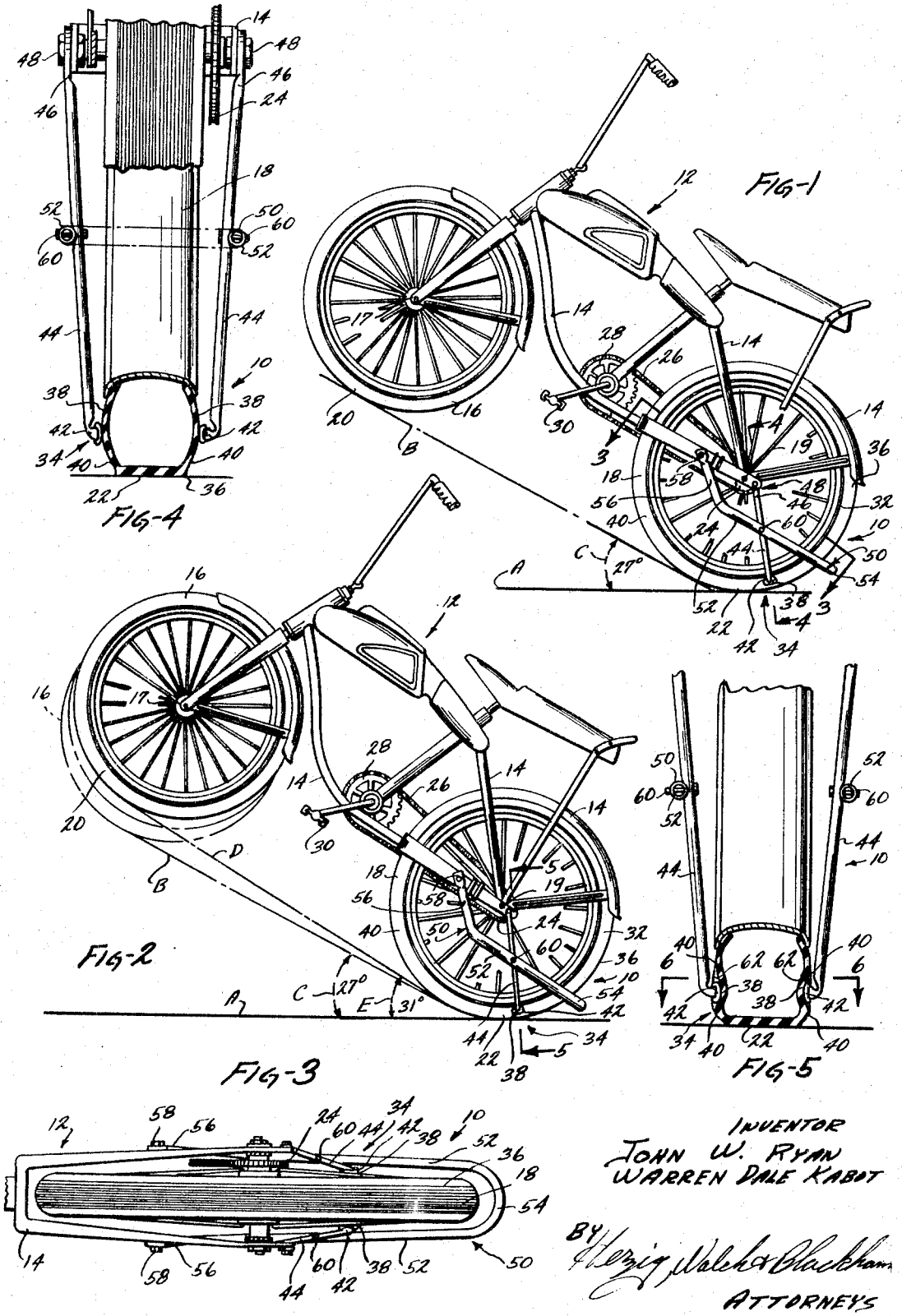

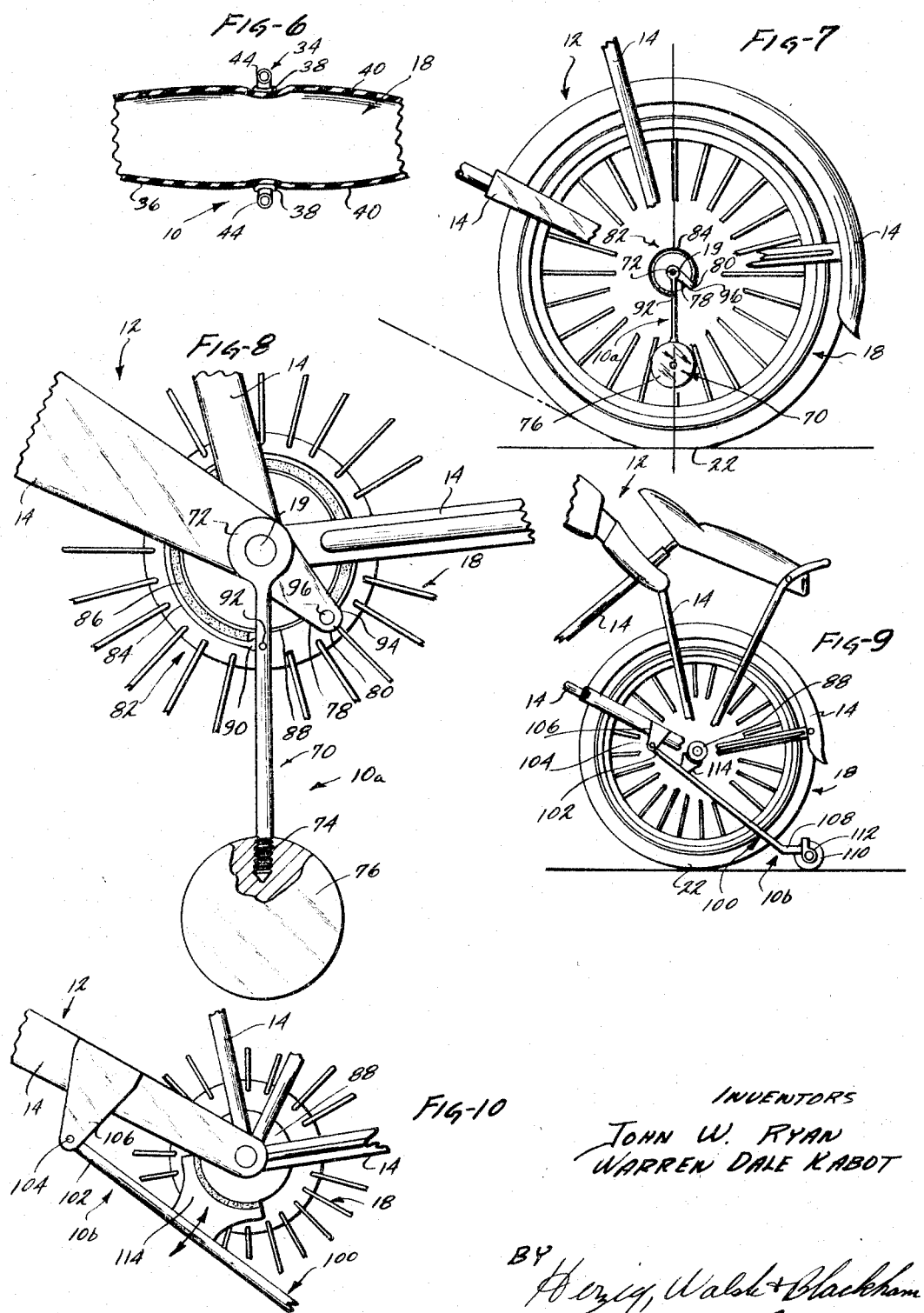

3,321,047
VEHICLE CONTROL APPARATUS
John W. Ryan, Bel Air, and Warren Dale Kabot, Manhattan Beach, Calif., assignors to Mattel, Inc., Hawthorne, Calif., a corporation of California
Filed Dec. 16, 1965, Ser. No. 514,302
3 Claims. (Cl. 188—24)

The present invention relates to new and useful vehicle control apparatus and more particularly to new and useful safety brake means for braking the rear wheel of a vehicle when the vehicle frame tilts towards the rear past a point at which an occupant of the vehicle is safely balanced, thereby minimizing the possibility of the occupant and the vehicle falling over backwards.

The present invention will be described herein for purposes of illustration, but not of limitation, in combination with a velocipede in the form of a bicycle. However, since many other applications of the principles of the present invention will manifest themselves, it is to be understood that the combination herein described is not intended to be limited to velocipedes in the form of bicycles, but also in combination with sporting and amusement vehicles of various types.

An innovation in bicycle riding which has caught the fancy of a certain group of bicycle riders who are athletically inclined comprises tipping a bicycle back on its rear wheel. If the rider's sense of balance and muscular control is sufficiently good, the bicycle can be ridden around in this position. Riding a bicycle in this position has gained such popularity among youngsters that they sometimes refer to it as "doing wheelies."

A rider maneuvering a bicycle while it is tipped back on its rear wheel is in little danger of being injured should the bicycle fall forward because the bicycle lands in its normal bicycle riding position. Falling backwards, on the other hand, may result in serious injury to the rider. Thus, a bicycle rider "doing wheelies" is in danger of becoming injured by the bicycle falling over backwards.

This danger may be minimized by following the teaching of the present invention which recognizes that any braking of the rear wheel while the bicycle and rider are proceeding forwardly on only the rear wheel tends to pivot the rider and the upper portion of the bicycle forward so that the bicycle will fall forward and resume a normal bicycle riding position.

In view of the foregoing, it is a primary object of the present invention to provide new and useful safety brake means for braking the rear wheel of a vehicle when the frame of the vehicle tilts towards the rear past a point at which a rider on the vehicle is safely balanced, to minimize the possibility of the rider falling over backwards.

Another object of the present invention is to provide, in combination with a vehicle having ground-engaging front and rear wheel means for moving the vehicle on a surface, the combination comprising safety brake means for restraining or preventing rotation of the rear wheel means when the plane between the ground engaging portions of said front and rear wheel means departs from the plane of said surface a predetermined amount.

Yet another object of the present invention is to provide new and useful safety brake means of the type described which comprises a gravity sensor, brake means connected to the rear wheel of a vehicle and means connecting the gravity sensor to the brake means.

Still another object of the present invention is to provide a safety brake means of the type described which includes surface sensor means engaging the surface on which a vehicle is moving to sense a predetermined departure by the plane between the ground engaging portions of the front and rear wheels of a vehicle from the plane of the surface.

A further object of the present invention is to provide a safety brake means of the type described which depends upon the bulging of a pneumatic tire in contact with the ground under the rider's weight and which includes a friction surface adjacent the point where the tire is in contact with the ground when the vehicle is tilted backwards so that progressive bulging of the tire produces a braking action by the engagement of the friction surface with the bulged portion of the tire.

Another object of the present invention is to provide a new and useful safety brake means of the type described especially designed for efficiently, safely and economically preventing a bicycle from rearing over backwards when the plane between the front wheel of the bicycle and the rear wheel of the bicycle departs a predetermined amount from the plane of the surface on which the bicycle is moving.

According to the present invention, a safety brake means is attached to a vehicle in such a manner that the safety brake means applies braking means to the rear wheels of the vehicle when the vehicle frame tilts towards the rear past a point at which a rider on the vehicle is safely balanced to minimize the possibility of the rider falling over backwards when the rider of the vehicle is proceeding along on the rear wheel only.

In one form of the invention, the safety brake means is attached to a bicycle frame and includes a friction surface which is positioned rearwardly of the ground-engaging portion of the tire on the rear wheel of a bicycle when it is in normal riding position and which becomes adjacent the ground-engaging portion when the bicycle is tilted backwards beyond a predetermined amount, whereby the progressive bulging of the bicycle tire due to the added weight on the ground-engaging portion causes the tire to engage the friction surface producing a braking action on the rear wheel. When the bicycle and rider are proceeding along on the rear wheel only, this braking action tends to pivot the rider and the upper portion of the bicycle forward so that the rider will not fall over backwards when the bicycle is tilted beyond said predetermined amount. Thus, the friction surface becomes adjacent the bulged portion of the tire when the plane between the ground engaging portions of the front and rear wheels of the bicycle depart from the plane of the surface over which the bicycle is ridden a predetermined amount.

In another form of the invention, the safety brake means includes a gravity sensor, such as a pendulum, which actuates a brake on the rear wheel of the bicycle when the plane between the front and rear wheels of the bicycle departs a predetermined amount from the plane of the surface on which the bicycle is moving.

In still another form of the present invention, the safety brake means comprises a ground sensor in the form of a feeler wheel which reports the extent to which the plane between the bottom of the front and rear wheels has departed from the plane of the surface on which the bike is riding and which actuates a brake mechanism to prevent further rotation of the rear wheel when this departure exceeds a predetermined amount.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference numerals to refer to like elements in the several views.

In the drawings:

FIGURE 1 is a side elevational view showing a new and useful safety brake means of the present invention in combination with a bicycle wherein the bicycle is in a first elevated position for proceding along a suitable surface on the rear wheel only;

FIGURE 2 is a side elevational view similar to FIGURE 1 showing the bicycle elevated to a greater extent wherein the plane between the front and rear wheels of the bicycle departs a predetermined amount from the plane of the surface on which the bicycle may be ridden;

FIGURE 3 is an enlarged, partial cross-sectional view taken along line 3—3 of FIGURE 1;

FIGURE 4 is an enlarged, partial cross-sectional view taken along line 4—4 of FIGURE 1;

FIGURE 5 is an enlarged, partial cross-sectional view taken along line 5—5 of FIGURE 2;

FIGURE 6 is an enlarged, partial cross-sectional view taken along line 6—6 of FIGURE 5;

FIGURE 7 is an enlarged, partial elevational view of the bicycle of FIGURE 1 showing a modified form of the safety brake means of the present invention in position on the rear wheel thereof;

FIGURE 8 is an enlarged, partial elevational view similar to FIGURE 7 showing the bicycle elevated to its FIGURE 2 position with the safety brake means braking the rear wheel of the bicycle;

FIGURE 9 is a partial, elevational view of the bicycle of FIGURE 1 showing a second modified form of the safety brake means of the present invention; and FIGURE 10 is an enlarged elevational view similar to FIGURE 9 showing the bicycle elevated to its FIGURE 2 position with the safety brake means in an operative position to prevent rotation of the rear wheel.

Referring again to the drawings and particularly to FIGURES 1–6, a safety brake means constituting a presently preferred embodiment of the invention, generally designated 10, is shown for purposes of illustration, but not of limitation, in combination with a bicycle 12. The bicycle 12 includes a frame 14 on which a front wheel means 16 and a rear wheel means 18 are rotatably mounted by a front axle 17 and a rear axle 19, respectively. The front wheel means 16 includes a ground-engaging portion 20 and the rear wheel means includes a ground-engaging portion 22 both of which are adapted to engage a suitable surface having a substantially horizontal plane A when the bicycle 12 is operated under normal conditions by a rider (not shown).

The rear wheel means 18 includes a conventional sprocket 24 about which a chain 26 is trained for transmitting power to the rear wheel means 20 through a pedal driven sprocket 28. A skilled rider may elevate the bicycle 12 in such a manner that the front wheel means 20 rises above the plane A to the position shown in FIGURE 1 wherein a plane B between the ground engaging portions 20 and 22 forms a predetermined angle C with the plane A. The rider may then operate the bicycle 12 causing it to ride on the surface represented by plane A on the rear wheel means 18 by rotating the pedal-driven sprocket 28 by suitable pedals, such as the one shown at 30.

Since it is rather difficult to maintain the bicycle 12 in its FIGURE 1 position while it is being ridden on only the rear wheel means 18, the rider will tend to raise and lower the front wheel means 16, as indicated in broken lines in FIGURE 2. Should the front wheel means 16 be elevated to the position shown in full lines in FIGURE 2 wherein the plane D between the ground engaging portions 20 and 22 departs from the plane A a predetermined amount, as indicated by angle E, the frame 14 rotates about the rear axle 19 in a clockwise direction, as viewed in FIGURES 1 and 2, sufficiently that the center of gravity of the rider (not shown) and the vehicle shifts toward the rear portion 32 of the bicycle 12 until the bicycle falls over backwards. Thus, the bicycle frame 14 tilts toward the rear portion 32 of the bicycle 12 past a point at which the rider is safely balanced.

The safety brake means 10 minimizes the danger of a rider falling over backwards by applying a brake means 34 to the rear wheel means 18 by engaging tire 36 forming a part of the rear wheel means 18. The brake means 34 includes a pair of friction surfaces 38 which are positioned immediately adjacent the sides 40 of the tire 36 at a point below the axle 19 and to the rear of the ground-engaging portion 22 when the ground-engaging portion 20 of the front wheel means 16 is in contact with the surface represented by plane A. This position is established by mounting the friction surfaces 38 on the ends 42 of associated arms or struts 44 having ends 46, which are remote from the ends 42, connected to the frame 14 by suitable bolt and nut assemblies 48 and by a somewhat U-shaped bracket 50 having arms 52 maintained in a spaced relationship on opposite sides of the wheel means 18 by a bight portion 54. The ends of the bracket 50 remote from the bight portion 54 include upwardly extending portions 56 which are pinned to the frame 14 by fastening means 58. The struts 44 are each connected intermediate their ends 42 and 46 to an associated arm 52 intermediate the bight portion 54 and the upwardly extending protions 56 by a suitable fastening means 60.

When the bicycle 12 is in its FIGURE 1 position, the tire 36 will appear in cross-section somewhat as shown in FIGURE 4 wherein it is noted that the sides 40 do not contact the friction surfaces 38. However, when the bicycle 13 is tilted to its FIGURE 2 position, the sides 40 of the tire 36 will bulge under the weight of the rider forming bulged portions 62. As the bicycle 12 is tilted backwards toward the FIGURE 2 position, the friction surfaces 38 move toward a position adjacent the ground-contacting portion 22 where the bulge 62 is being formed progressively as the frame 14 of bicycle 12 is tilted more and more. When the frame 14 reaches its FIGURE 2 position, the bulge 62 will be sufficient to firmly engage the friction surfaces 38 so that continued rotation of the wheel means 18 is prevented. This produces a desired braking action which tends to pivot the rider and the elevated portion of frame 14 forwardly and downwardly so that the bicycle 12 will land in a normal riding position on the surface represented by plane A. Thus, when the plane D departs from the plane of the plane A a predetermined amount, as indicated by angle E, the bulge 62 contacts the friction surfaces 38 braking the wheel means 18 so that the frame 14 pivots about the axle 19 in a counter clockwise direction until the wheel means 16 contacts the surface represented by plane A placing the bicycle 12 in conventional riding position.

Referring now to FIGURES 7 and 8, a safety brake means constituting a second embodiment of the present invention, generally designated 10a, may be substituted for the safety brake means 10 shown in FIGURES 1–6. The safety brake means 10a includes a gravity sensor 70 having an end 72 pivotally mounted on the axle 19 of wheel means 18. The sensor 70 includes an externally threaded end 74 remote from the end 72 to which an internally threaded weight 76 is affixed.

The safety brake 10a includes a bracket means 78 which is affixed to the frame 14 and which includes a free end 80 extending rearwardly and downwardly from the rear portion of the frame 14. The safety brake means 10a also includes a brake means 82 comprising a brake band 84 having high-coefficient of friction lining 86 provided on the inner surface thereof in substantially encompassing relationship with a hub portion 88 provided on the wheel means 18. The brake band 84 includes a first end 90 which is connected to the sensor 70 intermediate its ends 72 and 74 by a pin 92 and a second end 94 which is pinned to the end 80 of bracket 78 by a pin 96.

The weight 76 causes the gravity sensor 70 to depend from the axle 19 as shown in FIGURES 7 and 8 regardless of the amount of tilting of the frame 14. However, since the bracket 80 is affixed to the frame 14, tilting of the frame 14 in such a manner that it tends to rotate about axle 19 in a clockwise direction, as viewed in FIGURES 7 and 8, brings the end 80 of bracket 78 closer to the end 90 of brake band 84 causing it to grip the hub 88 to prevent further rotation of the wheel means 18. The brake band 84 and the bracket 78 are so dimensioned and positioned with respect to the frame 14 and the gravity sensor 70 that tilting of the frame 14 to the FIGURE 2 position will cause the brake band 84 to grip the hub 88. Thus, rotation of the wheel means 18 is prevented by the braking means 82 when the plane D (FIGURE 2) departs from the plane A of the surface on which the bicycle 12 is ridden a predetermined amount as indicated by angle E in FIGURE 2. The braking means 82 is actuated by the co-action of the free-swinging gravity sensor 70 and the fixed bracket 78 on the band 84.

A third embodiment of the present invention is shown in FIGURES 9 and 10 wherein a safety brake means 10b is substituted for the safety brake means 10 on the bicycle 12.

The safety brake means 10b includes a ground sensor 100 having an end 102 pivotally connected to the frame 14 by a pin 104 which engages a clamp 106 provided on the frame 14. The sensor 100 also has an end 108 on which a feeler wheel 110 is rotatably mounted by a pin 112. A brake shoe 114 is mounted on the sensor 100 intermediate the ends 102 and 108 for engagement with the hub 88 on wheel means 18.

The feeler wheel 110 reports the extent to which the planes B and D shown in FIGURE 2 depart from the plane A to the brake shoe 114. When the frame 14 tilts to its FIGURE 2 position, this departure is sufficient that the brake shoe 114 engages the hub 88 to prevent further rotation of the wheel means 18.

While the particular safety brake means herein shown and described in detail are fully capable of attaining the objects and providing the advantages hereinbefore stated, it is to be understood that they are merely illustrative of the presently preferred embodiments of the invention and that no limitations are intended to the details of construction or design herein shown and described other than as defined in the appended claims.

What is claimed is:
1. A vehicle comprising:
front wheel means having a ground-engaging portion;
rear wheel means having a ground-engaging portion for moving said vehicle on a surface, said rear wheel means including means for forming bulged portions therein adjacent said ground-engaging portion thereof when said front wheel means is elevated while said rear wheel means remains in contact with said surface;
frame means rotatably mounting said front and rear wheel means; and
safety brake means for braking said rear wheel means when the plane between the ground-engaging portions of said front and rear wheel means departs from the plane of said surface a predetermined amount, said safety brake means comprising bracket means connected to said frame means adjacent said rear wheel means, friction surface means engageable by said bulged portions and arm means connecting said friction surface means to said bracket means and said frame means in such a manner that said friction surface means is held immediately adjacent the side of said rear wheel means at a point below the axis of rotation of said rear wheel means and to the rear of said ground-engaging portion of said rear wheel means when said front wheel means is on said surface, said arm means and said bracket means positioning said friction surface means immediately adjacent said ground engaging portion of said rear wheel means when said frame means tilts sufficiently that the plane betwen the ground-engaging portions of said front and rear wheel means departs from the plane of said surface a predetermined amount, whereby said friction surface means is engaged by said bulged portions.

2. In combination with a bicycle having a front wheel including a ground-engaging portion, frame means, and a rear wheel including an inflatable tire having a ground-engaging portion, said tire being adapted to bulge adjacent said ground-engaging portion thereof due to the weight of a rider in position on said bicycle, apparatus for preventing said bicycle from tilting over backwards when said front wheel is elevated by said rider in such a manner that said bicycle may be manoeuvred by said rider on a surface on said rear wheel only, comprising:
friction surface means engageable by said bulge for automatically braking said rear wheel when said front wheel is elevated sufficiently that a plane passing through said ground-engaging portions departs from the plane of said surface a predetermined amount; and
arm means connecting said friction surface means to said frame means, said arm means including means comprising its physical shape and dimensions for positioning said friction surface means adjacent said bulge in such a position that said frame means swings said friction surface means into engagement with said bulge for performing said automatic braking function when said predetermined departure takes place.

3. In combination with a bicycle having a front wheel including a ground-engaging portion, frame means, and a rear wheel including an inflatable tire having a ground-engaging portion, said tire being adapted to bulge adjacent said ground-engaging portion due to the weight of a rider in position on said bicycle, apparatus for preventing said bicycle from tilting over backwards when said front wheel is elevated by said rider in such a manner that said bicycle may be manouevred by said rider on a surface on said rear wheel only, comprising:
friction surface means engageable by said bulged portion when the plane between said ground-engaging portions departs from the plane of said surface a predetermined amount; and
arm means connecting said friction surface means to said frame means in such a manner that said friction surface means is held immediately adjacent the side of said tire at a point below the axis of rotation of said rear wheel and to the rear of said ground-engaging portion of said tire when said front wheel is on said surface, said arm means positioning said friction surface means immediately adjacent said ground-engaging portion of said tire when said front wheel is elevated sufficiently that the plane between said ground-engaging portions departs from the plane of said surface said predetermined amount, whereby said friction surface means is engaged by said bulged portion.

References Cited by the Examiner

UNITED STATES PATENTS 3,244,251  4/1966  Duncan _____ 188—177

FOREIGN PATENTS 1,113,873  12/1955  France.
61,514  8/1948  Netherlands.

MILTON BUCHLER, *Primary Examiner.*

B. S. MOWRY, W. T. BUCKMAN, *Assistant Examiners.*